United States Patent
Svihla et al.

(10) Patent No.: US 10,267,214 B2
(45) Date of Patent: Apr. 23, 2019

(54) COMPRESSOR INLET RECIRCULATION SYSTEM FOR A TURBOCHARGER

(71) Applicant: Progress Rail Locomotive Inc., LaGrange, IL (US)

(72) Inventors: Gary R. Svihla, Burr Ridge, IL (US); Joshua D. Schueler, New Lenox, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 518 days.

(21) Appl. No.: 14/500,428

(22) Filed: Sep. 29, 2014

(65) Prior Publication Data

US 2016/0090901 A1 Mar. 31, 2016

(51) Int. Cl.
| F04D 29/68 | (2006.01) |
| F02B 37/02 | (2006.01) |
| F04D 29/42 | (2006.01) |
| F01D 9/06 | (2006.01) |
| F01D 25/24 | (2006.01) |

(52) U.S. Cl.
CPC .............. *F02B 37/02* (2013.01); *F01D 9/06* (2013.01); *F01D 25/24* (2013.01); *F04D 29/4213* (2013.01); *F04D 29/685* (2013.01); *F05D 2220/40* (2013.01); *Y02T 10/144* (2013.01)

(58) Field of Classification Search
CPC .. F04D 29/526; F04D 29/685; F04D 29/4213; F04D 17/10; F02B 37/02; F02B 37/127; F05D 2260/606
USPC ......................................................... 415/58.4
See application file for complete search history.

(56) References Cited

U.S. PATENT DOCUMENTS

| 4,990,053 A * | 2/1991 | Rohne ................. F04D 29/4213 |
| | | 415/143 |
| 5,282,718 A * | 2/1994 | Koff ........................ F01D 11/08 |
| | | 415/57.3 |
| 6,447,241 B2 * | 9/2002 | Nakao ................. F04D 29/4213 |
| | | 415/1 |
| 6,945,748 B2 | 9/2005 | Svihla et al. |
| 7,229,243 B2 | 6/2007 | Nikpour et al. |
| 7,775,759 B2 | 8/2010 | Sirakov et al. |
| 8,052,375 B2 * | 11/2011 | Turnquist ................ F01D 11/04 |
| | | 415/57.4 |

(Continued)

FOREIGN PATENT DOCUMENTS

| DE | 4213047 A1 | 10/1993 |
| DE | 19823274 C1 | 10/1999 |
| GB | 2470050 A | 11/2010 |

*Primary Examiner* — Richard A Edgar
*Assistant Examiner* — Michael L Sehn
(74) *Attorney, Agent, or Firm* — Finnegan, Henderson, Farabow, Garrett & Dunner, LLP

(57) ABSTRACT

A compressor inlet recirculation system is disclosed. The compressor inlet recirculation system may have a compressor housing. The compressor inlet recirculation system may also have a compressor impeller disposed within the compressor housing. The compressor inlet recirculation system may further have an inlet flow guide attached to the compressor housing. The inlet flow guide may be configured to direct air to the compressor impeller. The inlet flow guide may have an inlet slot and an outlet slot spaced axially from the inlet slot. The compressor inlet recirculation system may also have an annular air passage extending between the inlet slot and the outlet slot.

15 Claims, 3 Drawing Sheets

(56) References Cited

U.S. PATENT DOCUMENTS

| | | |
|---|---|---|
| 8,272,832 B2 | 9/2012 | Yin |
| 8,465,251 B2 | 6/2013 | Hosoya et al. |
| 8,522,549 B2 | 9/2013 | Sumser et al. |
| 2010/0143111 A1 | 6/2010 | Kuehnel |

* cited by examiner

US 10,267,214 B2

COMPRESSOR INLET RECIRCULATION SYSTEM FOR A TURBOCHARGER

TECHNICAL FIELD

The present disclosure relates generally to a compressor inlet recirculation system and, more particularly, to a compressor inlet recirculation system for a turbocharger.

BACKGROUND

Internal combustion engines, for example, diesel engines, gasoline engines, or natural gas engines employ turbochargers to deliver compressed air for combustion in the engine. A turbocharger compresses air flowing into the engine, helping to force more air into combustion chambers of the engine. The increased supply of air allows for increased fuel combustion in the combustion chambers of the engine, resulting in increased power output from the engine.

A typical turbocharger includes a housing, a shaft, a turbine wheel attached to one end of the shaft, a compressor impeller connected to the other end of the shaft, and bearings to support the shaft. Exhaust from the engine expands over the turbine wheel and rotates the turbine wheel. The turbine wheel in turn rotates the compressor impeller via the shaft. The compressor impeller receives cool air from the ambient and forces compressed air into combustion chambers of the engine.

Compressors for turbocharger applications must have a wide operating range to account for the variations in operating conditions of the engine associated with the turbocharger. The operational range of a compressor can be defined as the range of pressure ratios between a choke condition and a surge condition. A choke condition occurs when the mass flow rate of air through the compressor reaches a maximum value because of, for example, sonic flow conditions between the compressor blades. A surge flow condition occurs when the mass flow rate of air through the compressor becomes limited due to flow instability caused by, for example, flow separation. A recirculation passage is often provided in the compressor inlet channel to recirculate air and increase the operational range of the compressor.

U.S. Pat. No. 6,945,748 B2 of Svihla et al. that issued on Sep. 20, 2005 ("the '748 patent") discloses one such recirculation system. In particular, the '748 patent discloses an annular inlet air recirculation channel extending from a first slot upstream of the vanes of the compressor impeller to a second slot downstream of the vanes. The '748 patent discloses that the recirculation channel is formed using an aerodynamic channel ring supported in a smooth annular recess formed in the compressor housing. The '748 patent further discloses that the channel ring is mounted using radial struts connected to the housing. Further, the '748 patent discloses that the channel ring and the channel recess may be machined to form smoothly variable surfaces prior to the assembly of the ring into the housing.

Although the '748 patent discloses a recirculation system, the disclosed recirculation system may still be improved upon. In particular, formation of the recirculation channel of the '748 patent may require extensive machining of the support arms and related surrounding housings to accommodate the ring. Additionally, the arrangement disclosed in the '748 patent may require machining of the struts required to attach the ring to the housing. Further, because the ring is separately machined from the housing, alignment of the ring with the housing to achieve optimal recirculation may be difficult.

The compressor inlet recirculation system of the present disclosure solves one or more of the problems set forth above and/or other problems of the prior art.

SUMMARY

In one aspect, the present disclosure is directed to a compressor inlet recirculation system. The compressor inlet recirculation system may include a compressor housing. The compressor inlet recirculation system may also include a compressor impeller disposed within the compressor housing. The compressor inlet recirculation system may further include an inlet flow guide attached to the compressor housing. The inlet flow guide may be configured to direct air to the compressor impeller. The inlet flow guide may have an inlet slot and an outlet slot spaced axially from the inlet slot. The compressor inlet recirculation system may also include an annular air passage extending between the inlet slot and the outlet slot.

In another aspect, the present disclosure is directed to a turbocharger. The turbocharger may include a turbine housing. The turbocharger may also include a turbine wheel disposed within the turbine housing. The turbine wheel may be configured to be driven by exhaust received from an engine. The turbocharger may further include a compressor housing. The turbocharger may also include a compressor impeller disposed within the compressor housing. Further, the turbocharger may include an inlet flow guide extending from a front end to a rear end disposed opposite the front end. The inlet flow guide may be connected to the compressor housing. The inlet flow guide may include an inlet portion extending from the front end to a distal end disposed between the front end and the rear end. The inlet flow guide may also include a wing ring extending from adjacent the distal end to adjacent the rear end. In addition, the inlet flow guide may include an inlet slot disposed adjacent the rear end and an outlet slot disposed adjacent the distal end and spaced axially from the inlet slot. The turbocharger may also include an annular air passage extending between the inlet slot and the outlet slot.

DETAILED DESCRIPTION

Figure 1:
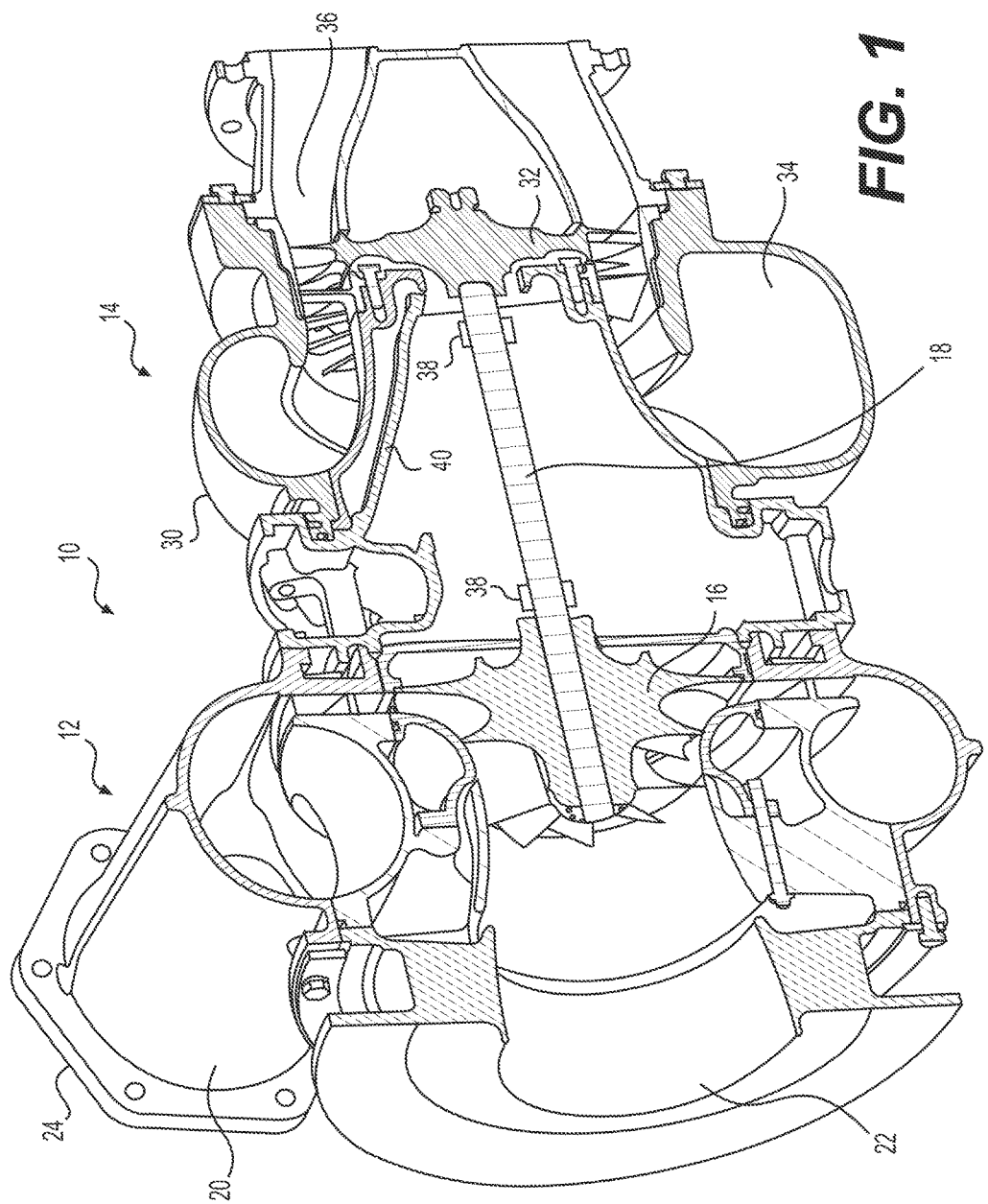
FIG. 1 is a cut-away view of an exemplary disclosed turbocharger.

FIG. 1 illustrates an exemplary embodiment of a turbocharger 10. Turbocharger 10 may be used with an engine (not shown) of a machine that performs some type of operation associated with an industry such as railroad, marine, power generation, mining, construction, farming, or another industry known in the art. As shown in FIG. 1, turbocharger 10 may include compressor stage 12 and turbine stage 14. Compressor stage 12 may embody a fixed geometry compressor impeller 16 attached to shaft 18 and configured to compress air received from an ambient to a predetermined pressure level before the air enters the engine for combustion. Air may enter compressor housing 20 via compressor inlet 22 and exit compressor housing 20 via compressor outlet 24. As air moves through compressor stage 12, compressor impeller 16 may increase the pressure of the air which may be directed into the engine.

Turbine stage 14 may include turbine housing 30 and turbine wheel 32, which may be attached to shaft 18. Exhaust gases exiting the engine may enter turbine housing 30 via turbine inlet 34 and exit turbine housing 30 via turbine outlet 36. As the hot exhaust gases move through turbine housing 30 and expand against the blades of turbine wheel 32, turbine wheel 32 may rotate compressor impeller 16 via shaft 18. Bearings 38 may support shaft 18. Bearings 38 may be disposed in bearing housing 40. Although FIG. 1 illustrates only two bearings 38, it is contemplated that turbocharger 10 may include any number of bearings 38.

Figure 2:
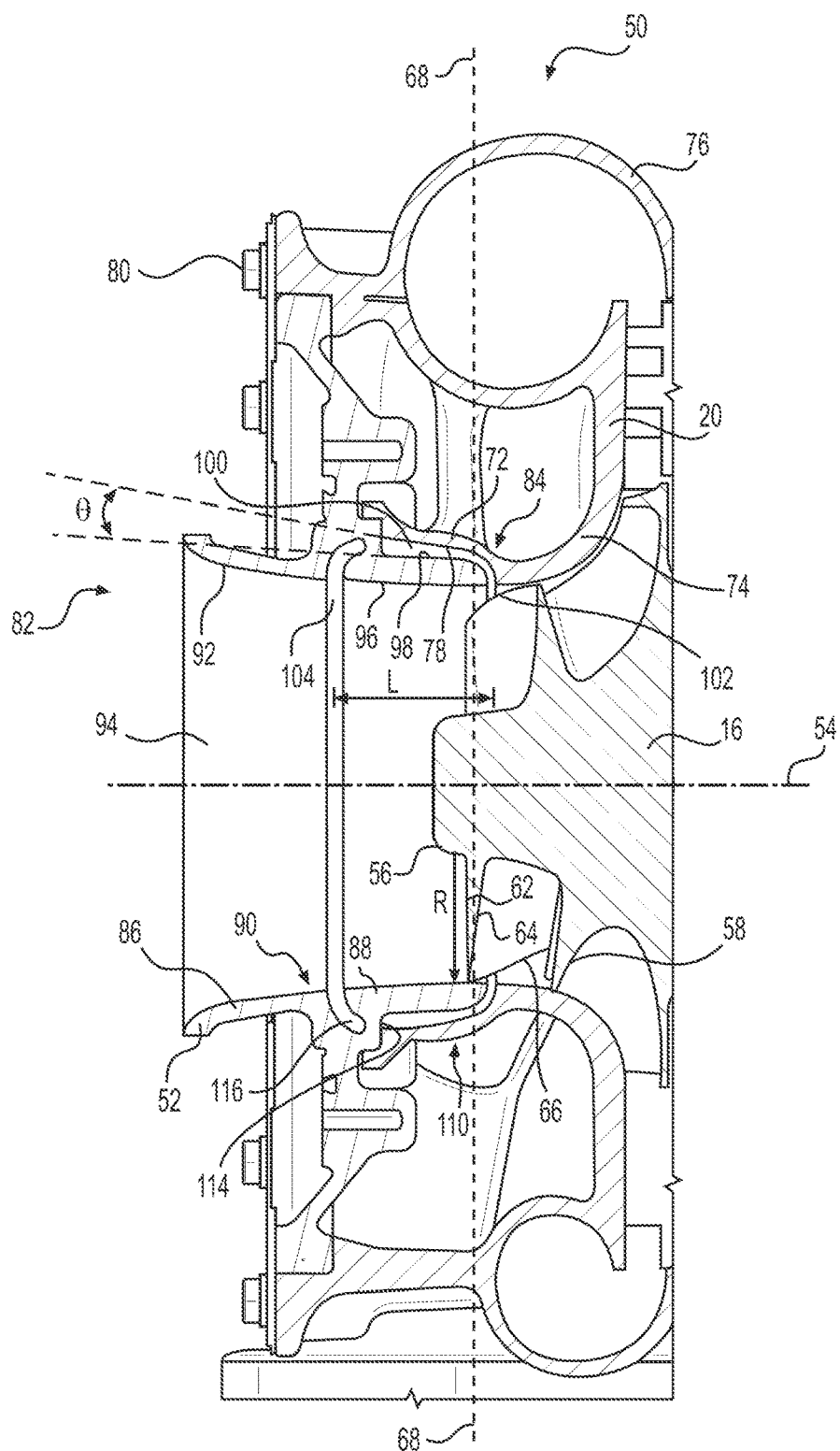
FIG. 2 is a cut-away view of an exemplary disclosed compressor inlet recirculation system for the turbocharger of FIG. 1.

FIG. 2 illustrates a cut-away view of an exemplary embodiment of a compressor inlet recirculation system 50 for turbocharger 10. Compressor inlet recirculation system 50 may include compressor impeller 16, compressor housing 20, and inlet flow guide 52, all of which may be disposed around a rotational axis 54 of compressor inlet recirculation system 50. Compressor impeller 16 may include a hub 56 and blades 58 disposed around hub 56. Each blade 58 may have a leading edge 62, a trailing edge 64, and an outer edge 66. Leading edges 62 of blades 58 may define an inducer plane 68 disposed generally perpendicular to rotational axis 54.

Compressor housing 20 may include compressor inlet portion 72, intermediate portion 74, and compressor volute 76. Compressor inlet portion 72 may form an annular inlet portion extending from a position upstream of hub 56 to a position downstream of hub 56. Compressor inlet portion 72 may include compressor inlet wall 78. Intermediate portion 74 of compressor housing 20 may circumscribe the outer edges 66 of blades 58. Compressor volute 76 may be disposed radially outward from intermediate portion 74 and from outer edges 66 of blades 58. Compressor volute 76 may receive pressurized air from blades 58 and direct the pressurized air to the engine.

Inlet flow guide 52 may be connected to compressor housing 20 via one or more fasteners 80. Inlet flow guide 52 may extend from a front end 82 to a rear end 84 disposed opposite front end 82. Inlet flow guide 52 may include an inlet portion 86 and a wing ring 88. Inlet portion 86 may be disposed adjacent front end 82 of inlet flow guide 52. Inlet portion 86 may extend from front end 82 to adjacent distal end 90 disposed between front end 82 and rear end 84. Inlet portion 86 may have a first diameter adjacent front end 82 and a second diameter adjacent distal end 90. In one exemplary embodiment as illustrated in FIG. 2, the first diameter may be larger than the second diameter. Inlet portion 86 may also include inner wall 92, which may extend from front end 82 to distal end 90. Inner wall 92 may be smooth and may curve inward from front end 82 to distal end 90 forming an inlet passage 94 having an approximately frusto-conical shape.

Wing ring 88 may be an annular ring shaped structure disposed around rotational axis 54. Wing ring 88 may extend from adjacent distal end 90 to adjacent rear end 84. Wing ring 88 may have an inner ring wall 96 and an outer ring wall 98 disposed opposite inner ring wall 96. In one exemplary embodiment as illustrated in FIG. 2, wing ring 88 may have a cross-section that has an airfoil shape. It is contemplated, however, that wing ring 88 may have a cross-section having an elliptical shape or any other shape known in the art to allow air to flow around wing ring 88 smoothly.

Figure 3:
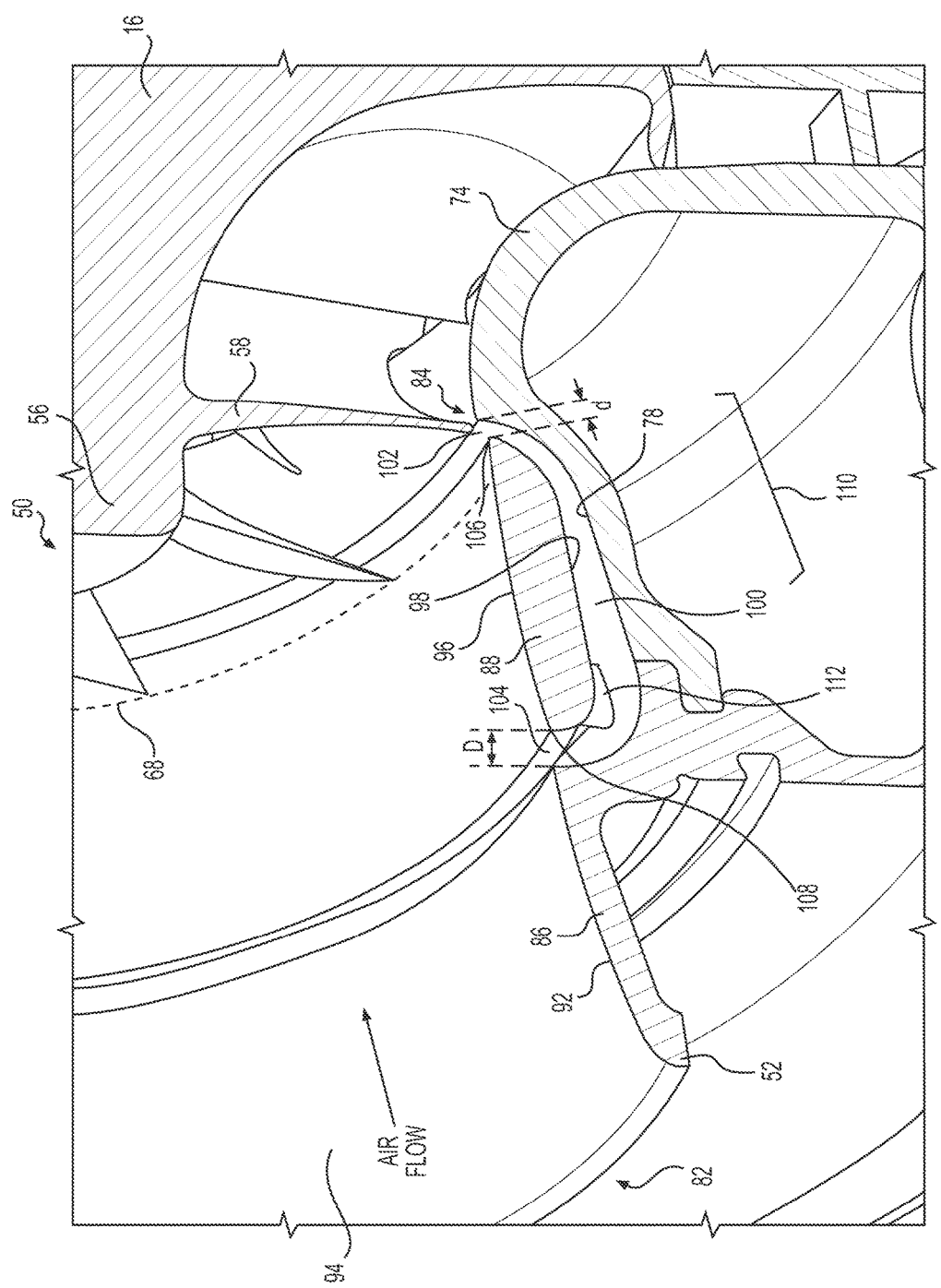
FIG. 3 is another cut-away view of the exemplary disclosed compressor inlet recirculation system of FIG. 2.

As illustrated in FIG. 3, outer ring wall 98 of wing ring 88 and compressor inlet wall 78 of compressor inlet portion 72 may form an annular air passage 100. Air passage 100 may have an inlet slot 102 in inlet flow guide 52 to an outlet slot 104 in inlet flow guide 52. Inlet slot 102 may be located axially downstream from inducer plane 68 and may be disposed adjacent rear end 84. Outlet slot 104 may be located axially upstream from inducer plane 68. Outlet slot 104 may be disposed adjacent distal end 90 and between inlet portion 86 and wing ring 88. A portion of the air flowing in inlet passage 94 from front end 82 towards rear end 84 through may enter air passage 100 via inlet slot 102. The portion of air in air passage 100 may exit via outlet slot 104 back into the air stream flowing in inlet passage 94.

As also illustrated in FIG. 3, inlet slot 102 may have a first width "d." Outlet slot 104 may have a second width "D." In one exemplary embodiment as illustrated in FIG. 3, second width D may be larger than first width d. Wing ring 88 may have a leading edge 106, which may be rounded. Wing ring may also have sharp trailing edge 108. Outer ring wall 98 may extend from leading edge 106 to trailing edge 108 in a curved fashion. The rounded leading edge 106 and curved outer ring wall 98 may help ensure that air can enter air passage 100 smoothly without flow separation. Inner ring wall 96 may also extend from leading edge 106 to trailing edge 108. The sharp trailing edge 108 may help ensure that air exits outlet slot 104 without flow separation. In one exemplary embodiment, outlet slot 104 may be arranged so that air leaving air passage 100 via outlet slot 104 may exit generally perpendicular to a direction of air flow from front end 82 towards rear end 84 in inlet passage 94.

Returning to FIG. 2, air passage 100 may include a diffuser portion 110. In diffuser portion 110, compressor inlet wall 78 may be inclined relative to outer ring wall 98 forming an approximately conical diffuser portion 110. As illustrated in FIG. 2, compressor inlet wall 78 may be disposed at an included angle "θ" relative to outer ring wall 98. In one exemplary embodiment, θ may range from about 4 degrees to about 8 degrees. As further illustrated in FIG. 2, inlet slot 102 may be axially separated from outlet slot 104 by an axial distance "L." In one exemplary embodiment, distance L may range from about 0.8 to 1.2 times a radial distance "R" measured from hub 56 to inner ring wall 96 at inducer plane 68.

Wing ring 88 may be attached to inlet flow guide 52 via a plurality of struts 112. In one exemplary embodiment, struts 112 may have an airfoil shape, which may have a rounded leading edge 114 and a sharp trailing edge 116. Leading edge 114 of each strut 112 may be disposed nearer to rear end 84 as compared to front end 82. Trailing edge 116 of each strut 112 may be disposed nearer to front end 82 as compared to rear end 84. Rounded leading edges 114 may help to minimize pressure loss as air flows from inlet slot 102 to outlet slot 104 around struts 112. As also illustrated in FIG. 2, struts 112 may be located nearer outlet slot 104 compared to inlet slot 102. Locating struts 112 nearer outlet slot 104 may further allow air to flow around struts 112 after slowing down in diffuser portion 110. Slowing down the air flow in this manner may also help minimize pressure loss as air flows around struts 112. In one exemplary embodiment, inlet portion 86, wing ring 88, and struts 112 may form an integrated casting. The shapes of wing ring 88 and struts 112 may be formed during the casting process, which may help reduce the amount of machining required to manufacture inlet portion 86 with wing ring 88 and struts 112. Further, making inlet portion 86, wing ring 88, and struts 112 as a single casting may also make it easier to align wing ring 88 relative to compressor housing 20 during assembly of turbocharger 10.

INDUSTRIAL APPLICABILITY

The disclosed compressor inlet recirculation system may be implemented to allow a portion of the air flow through compressor stage 12 to be recirculated to increase an operating range of compressor stage 12. In particular, during operation of turbocharger 10, a portion of air flowing from front end 82 towards rear end 84 in inlet passage 94 of inlet flow guide 52 may enter air passage 100 via inlet slot 102. The rounded leading edge 106 of wing ring 88 may help to minimize pressure loss as air enters air passage 100 via inlet slot 102. Air in air passage 100 may be slowed down as it flows through diffuser portion 110 to further minimize the pressure loss. Struts 112 may be shaped so as to allow air to flow around struts 112 in air passage 100 without excessive pressure loss. Slowing the air velocity through diffuser portion 110 may also help minimize the pressure loss as air flows around struts 112. Air may exit air passage 100 via outlet slot 104 in a direction that may be generally perpendicular to the air flow in inlet passage 94. Discharging air from outlet slot 104 generally perpendicular to the air flow in inlet passage 94 may allow the portion of air recirculating via air passage 100 to penetrate radially inward deep into the incoming air flow, helping to maximize the operating range of compressor stage 12. Further, air may exit from outlet slot 104 with a significant amount of angular momentum, which may in turn impart angular momentum to the incoming flow to help align the total flow with leading edges 62 of blades 58.

It will be apparent to those skilled in the art that various modifications and variations can be made to the disclosed compressor inlet recirculation system. Other embodiments will be apparent to those skilled in the art from consideration of the specification and practice of the disclosed compressor inlet recirculation system. It is intended that the specification and examples be considered as exemplary only, with a true scope being indicated by the following claims and their equivalents.

What is claimed is:

1. A compressor inlet recirculation system, comprising:
   a compressor housing having an inlet wall;
   a compressor impeller disposed within the compressor housing;
   an inlet flow guide attached to the compressor housing and configured to direct air to the compressor impeller, the inlet flow guide extending from a front end to a rear end, and including:
   an inlet portion;
   a wing ring integrally connected to the inlet portion, the wing ring including a generally airfoil shaped cross-section and an outer wall; and
   an outlet slot spaced axially from an inlet slot;
   a continuously diverging annular air passage formed by the inlet wall of the compressor housing and the outer wall of the wing ring, the air passage extending between the inlet slot and the outlet slot, wherein the outlet slot is oriented such that air exits from the outlet slot generally perpendicular to a direction of air flow from the front end to the rear end; and
   a plurality of struts configured to attach the wing ring to the inlet flow guide.

2. The compressor inlet recirculation system of claim 1, wherein the inlet flow guide extends from a front end to a rear end disposed opposite the front end, the inlet flow guide including:
   the inlet portion extending from the front end to a distal end disposed between the front end and the rear end; and
   the wing ring extending from adjacent the distal end to adjacent the rear end.

3. The compressor inlet recirculation system of claim 2, wherein the inlet slot is disposed adjacent the rear end; and
   the outlet slot is disposed adjacent the distal end and between the inlet portion and the wing ring.

4. The compressor inlet recirculation system of claim 1, wherein the inlet portion, the wing ring, and the struts form a casting.

5. The compressor inlet recirculation system of claim 1, wherein the struts have a generally airfoil shape.

6. The compressor inlet recirculation system of claim 1, wherein the compressor inlet wall and the outer ring wall are disposed at an angle relative to each other.

7. The compressor inlet recirculation system of claim 6, wherein the angle ranges from about 4 to 8 degrees.

8. The compressor inlet recirculation system of claim 1, wherein the compressor impeller includes:
   a hub; and
   a plurality of blades disposed around the hub, the blades having leading edges, wherein
   the leading edges define an inducer plane,
   the outlet slot is located at a first distance from the inlet slot, and
   a ratio of the first distance to a second, radial distance between the hub and the inner ring wall at the inducer plane ranges from about 0.8 to about 1.2.

9. The compressor inlet recirculation system of claim 1, wherein the plurality of struts each have a generally airfoil shape with a rounded leading edge and a trailing edge.

10. The compressor inlet recirculation system of claim 1, wherein the plurality of struts are each integrally cast with the inlet portion and the wing ring.

11. A turbocharger, comprising:
    a turbine housing;
    a turbine wheel disposed within the turbine housing and configured to be driven by exhaust received from an engine;
    a compressor housing having an inlet wall;
    a compressor impeller disposed within the compressor housing;
    an inlet flow guide extending from a front end to a rear end disposed opposite the front end, the inlet flow guide being connected to the compressor housing and including:
    an inlet portion extending from the front end to a distal end disposed between the front end and the rear end;
    a wing ring integrally connected to the inlet portion, the wing ring including a generally airfoil shaped cross-section and an outer wall extending from adjacent the distal end to adjacent the rear end;
    an inlet slot disposed adjacent the rear end; and
    an outlet slot disposed adjacent the distal end and spaced axially from the inlet slot;
    a continuously diverging annular air passage formed by the inlet wall of the compressor housing and the outer wall of the wing ring, the air passage extending between the inlet slot and the outlet slot, wherein the outlet slot is oriented such that air exits from the outlet slot generally perpendicular to a direction of air flow from the front end to the rear end; and a plurality of struts configured to attach the wing ring to the inlet flow guide.

12. The turbocharger of claim 11, wherein the inlet portion, the wing ring, and the struts form a casting.

13. The turbocharger of claim 11, wherein the compressor inlet wall and the outer ring wall are disposed at an angle relative to each other.

14. The turbocharger of claim 13, wherein the angle ranges from about 4 to 8 degrees.

15. The turbocharger of claim 11, wherein the compressor impeller includes:

a hub; and a plurality of blades disposed around the hub, the blades having leading edges, wherein the leading edges define an inducer plane, the outlet slot is located at a first distance from the inlet slot, and a ratio of the first distance to a second, radial distance between the hub and the inner ring wall at the inducer plane ranges from about 0.8 to about 1.2.

* * * * *